Patented July 6, 1926.

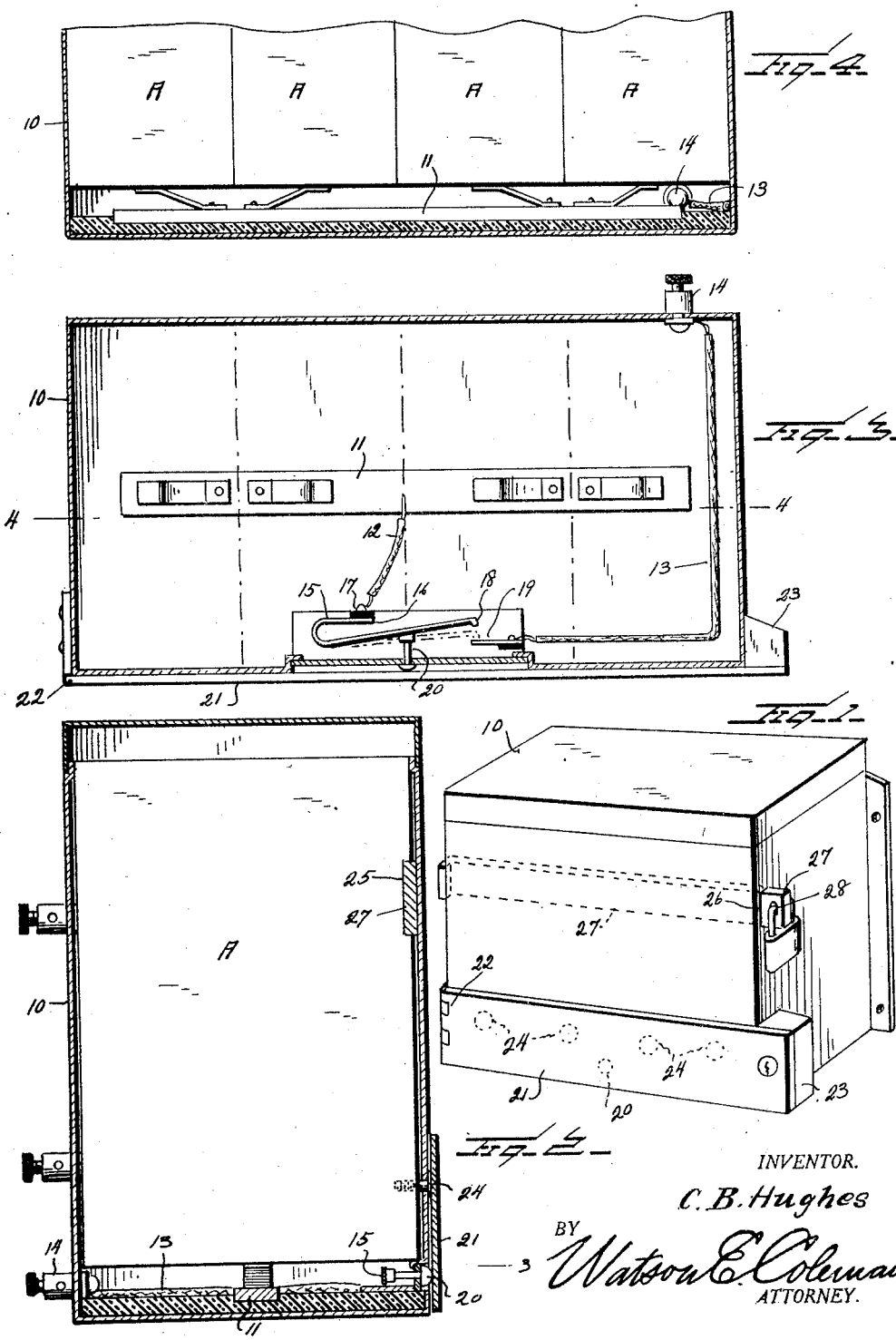

1,591,829

UNITED STATES PATENT OFFICE.

CHARLES B. HUGHES, OF NEW ORLEANS, LOUISIANA, ASSIGNOR OF ONE-SIXTH TO WALTER B. KEIFFER AND LIONEL ADAMS, BOTH OF NEW ORLEANS, LOUISIANA, AND ONE-HALF TO LEONARD J. ELMER, OF NEW ORLEANS, LOUISIANA.

LOCKING DEVICE FOR COIL BOXES.

Application filed October 2, 1924. Serial No. 741,236.

This invention relates to the coil boxes of motor cars, and the object of the invention is to provide means whereby the coils may be locked within the coil box so as to prevent unauthorized removal therefrom.

A further object is to provide normally unlocked means which, when in place and locked, will break the electrical connection through the coils so as to render these coils dead.

A still further object is to provide a coil box with a locking bar slidable into the box and withdrawable therefrom, this locking bar when slid into place acting to prevent the removal of the coils by engaging the same.

Another object is to provide a switch disposed in the coil box itself and disposed in circuit between the wire leading from the battery to the wire leading to the bus-bar of the coils, this switch being so constructed that when it is forced inward the circuit will be broken and the coils thereby rendered dead, and in this connection to provide a member mounted upon the coil box and which in its locked position will bear against this switch and open the switch, there being no way to permit the switch to close except by unlocking said member and opening it.

Other objects will appear in the course of the following description.

My invention is illustrated in the accompanying drawings, wherein:—

Figure 1 is a perspective view of a coil box constructed in accordance with my invention;

Figure 2 is a vertical section from front to rear of a coil box;

Figure 3 is a horizontal section on the line 3—3 of Figure 2;

Figure 4 is a vertical section on the line 4—4 of Figure 3.

Referring to these drawings, it will be seen that I have illustrated at 10 a coil box of any usual or suitable construction and illustrated as containing four coils of ordinary form, these coils being designated A. The coils are operatively connected, as usual, to a bus-bar 11 disposed in any suitable position but illustrated as disposed in the bottom of the box or at the lower end thereof, this bus-bar having a lead 12 extending therefrom and adapted to be connected by mechanism to be later stated with a battery. Also extending in the coil box is a lead 13 which at its outer end has a battery connection 14 whereby it may be connected up with the battery, this lead extending through the coil box adjacent the lower end thereof.

Disposed within the coil box is a switch formed of a resilient strip of metal 15, which at one end is connected, as at 16, to a transverse strip or rod 17 which is supported upon the inside of the coil box but is insulated therefrom. The lead 12 is connected to this metallic member and the switch strip 15 is connected to this metallic member. The strip forming the switch is folded upon itself and formed to provide a contact 18 adapted to normally bear against a conductor 19 which is connected to the lead 13. A pin 20 passes through the member 15 and is insulated therefrom, this pin being attached to the arm of the switch which carries the contact 18. Obviously, when this member 20 is forced inward, the contact 18 will be carried away from the member 19 and the circuit to the bus-bar 11 will be broken, and when pressure is relieved on the pin 20 the circuit will be closed.

For the purpose of thus opening the switch and holding it open, I provide a locking arm or plate 21 hinged at 22 to the end wall of the box, the free end of this locking bar 21 being formed with locking means whereby the bar may be locked against the box and, therefore, against the pin 20 and will hold this pin pushed inward and the contact 18 spaced from 19. Any suitable lock may be provided at the free end of the locking bar 21 whereby the locking bar may be held close against the box, and I have illustrated a lug 23 projecting out from the box, the locking bar having a locking member or barrel insertible into an opening in the member 23 and adapted to be locked by a key. The lug 23, however, may be provided with an aperture and a padlock might be used for this purpose.

I do not wish to be limited to any particular means for locking this bar 21 in place. The bar 21 when it is closed extends over the heads of screws 24 which extend through apertures in the front wall of the coil box, as shown in Figure 2, and into the coils. It is, therefore, necessary to remove these screws if it be desired to withdraw the coils, and obviously the screws cannot be removed until the bar 21 is swung outward. I do not wish to be limited to the particular method of mounting the bar 21, that is by means of a hinge, as other means might be provided for this purpose.

As before remarked, an object of the invention is to provide means for locking the coils from removal from the coil box, and to this end each coil is formed with a transversely extending groove 25 and the coil box is formed with transversely extending aligned apertures 26 through which a sliding locking bar 27 may be disposed, this locking bar when in place extending through the grooves 25 and thereby locking the coils from removal. One end of the locking bar is provided with a head and the other end of the locking bar extends out through the corresponding aperture 26 and is locked either by means of a padlock placed through the aperture 28 or by leading it to a lug projecting from the end of the box in any suitable manner. This device, of course, absolutely prevents the coils from being lifted out of the box when the lid of the coil box is raised.

It will be understood that this locking rod 27 is designed to be in place at all times, unless it be desired to remove the coils, when the locking bar may be unlocked and removed, but that when the coils are in use the hasp-like bar 21 is unlocked and turned backward, permitting the spring switch 15 to shift outward and cause the contact to operatively engage the rod 13, thus closing the circuit through the coils and also disclosing the securing screws for the coils. It will be seen that this makes this box burglar-proof and prevents entirely any attempt to remove the coils from the box itself. All parts are insulated from the coil box and, therefore, there is no danger of a short circuit at any point of electrical contact.

While I have illustrated certain details of construction and arrangement of parts, I do not wish to be limited thereto as it is obvious that many changes might be made therein without departing from the spirit of the invention as defined in the appended claims.

I claim:—

1. The combination with a coil box and coils therein, a bus-bar common to all the coils, an electrical conductor leading in through the box and adapted to be connected to a battery, of a switch disposed between the bus-bar and said conductor and normally urged to a position closing the circuit between the bus-bar and the conductor, a pin carried by said switch and projecting through the box, and a member adapted to be locked against the exterior of the box, said member when in place pressing inward against the pin and shifting the switch to an open position.

2. The combination with a coil box, induction coils therein, a bus-bar associated with and common to all the coils and a battery conductor extending into the coil box, of a switch normally completing the circuit between said conductor, the bus-bar and the coils, securing screws for the induction coils having heads extending through the coil box, a member mounted upon the coil box adapted to be locked in a position over the head of said securing screws, and means for locking said member in place.

3. A coil box and induction coils therein, each of the coils having a removable securing screw formed with a head, the coil box having apertures through which the screws pass, a bus-bar disposed within said box and electrically connected to the several coils, an electrical conductor extending inward through said box adapted to be connected at one end to a battery, a switch member resiliently urged to a closed position and normally establishing communication between the conductor and the bus-bar, and means for forcing said switch to an open position to break the circuit to the bus-bar and covering the heads of said securing screws comprising a member hinged at one end to the exterior of the coil box and extending entirely along the face of the coil box and over said heads and having means whereby it may be locked in closed position.

4. The combination with a coil box having coils therein and a battery connection thereto, of means carried by the box for locking the coils in place from removal from the box, means normally closing the circuit through the battery connection and the coils, means carried by the box and adapted to be shifted into a closed position and when so closed shifting said circuit closing means into circuit-breaking position and connecting said coil locking means, and means for locking said shiftable means in closed position.

5. A coil box having coils therein and means for locking the coils within the box comprising locking members engaged with the coils and extending outward through apertures in the box, and a locking bar hinged at one end to the exterior of the coil box and extending entirely along the face of the coil box and over said locking means, said bar having means whereby it may be locked in its closed position.

6. The combination with a coil box and coils therein, a bus-bar associated with and connected to all coils, an electrical conductor leading in through the box and adapted to be connected to a battery, of a switch disposed between the bus-bar and said conductor and normally urged to a position closing the circuit between the bus-bar and the conductor, and means detachably locked in engagement with the box and when so locked operatively bearing against the switch to hold it open.

7. The combination with a coil box and removable coils disposed therein, of removable means for locking said coils in position within the coil box, means for connecting the coils with a source of current including a switch located within the coil box, a movable member in one position thereof engaging said switch to maintain the same in open position, and means for locking said movable member in said position, said movable member when in said position covering and shielding from removal the securing means for said coils.

In testimony whereof I hereunto affix my signature.

CHAS. B. HUGHES.